3,397,923
FORAGE BLOWER MOUNTING STRUCTURE
Thomas J. Scarnato, Park Ridge, and Robert Sorensen and James J. Dryan, Chicago, and Craig M. Lawler, Downers Grove, Ill., assignors to International Harvester Company, Chicago, Ill., a corporation of Delaware
Filed Oct. 20, 1966, Ser. No. 588,190
6 Claims. (Cl. 302—37)

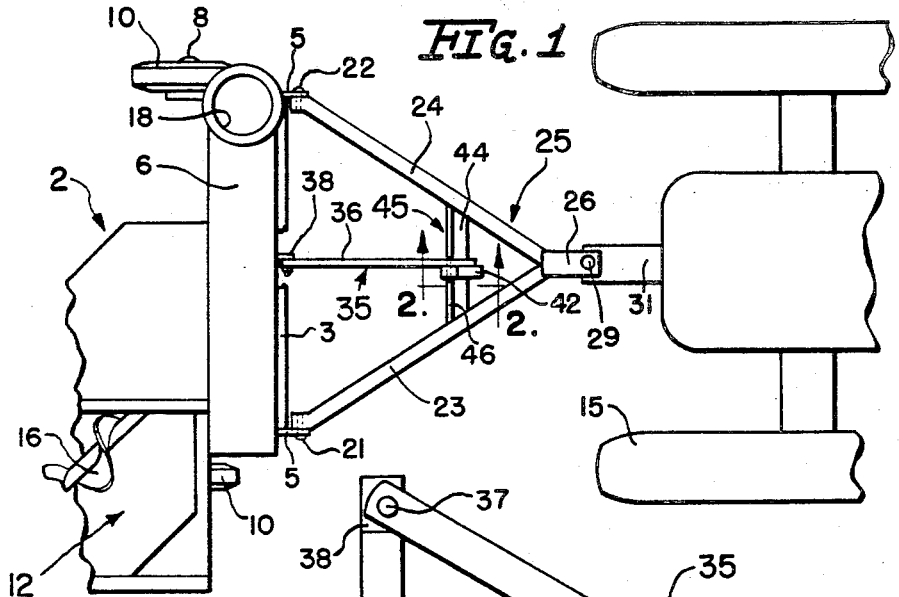
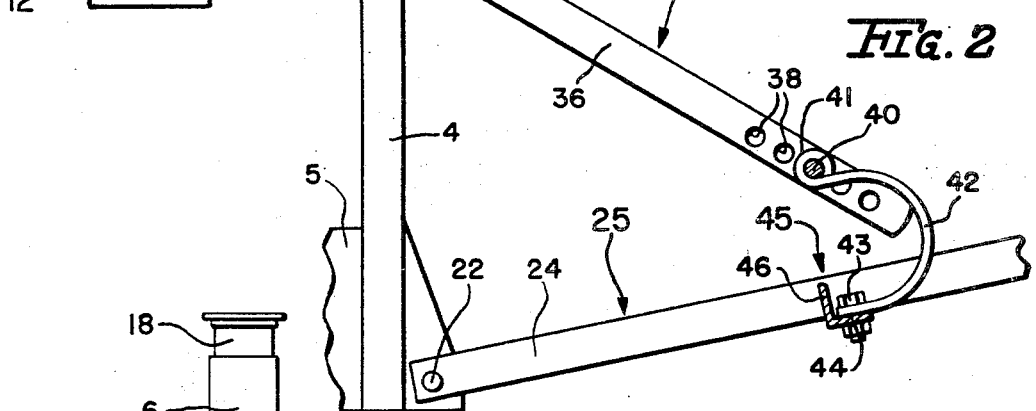
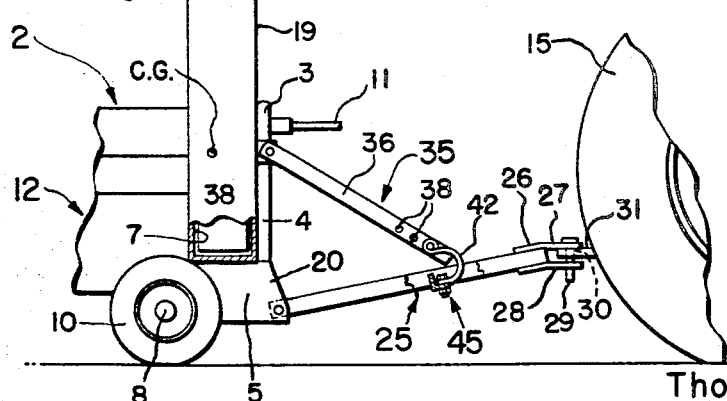
Inventors
Thomas J. Scarnato
Robert Sorensen
James J. Dryan
Craig M. Lawler
John J. Kowalik
Attorney

United States Patent Office 3,397,923
Patented Aug. 20, 1968

ABSTRACT OF THE DISCLOSURE

A forage blower mounting structure having a draft frame pivoted to the blower structure on a generally horizontal transverse axis, a diagonal adjusting and positioning and supporting strut pivoted on a horizontal axis to the blower structure above the aforesaid axis, and a spring assembly connecting the other end of the strut to the draft frame at a point ahead of the first mentioned axis.

---

This invention relates to forage blowers and more specifically to a mounting structure therefor.

Mounting structures for forage blowers have in the past comprised a wheeled frame upon which the blower and conveyor were mounted. In such constructions extremely rigid framework, extensively braced, was used in order to overcome the peak loads encountered during transport and operation of the unit.

The present invention comprehends the provision of a novel yieldable frame which connects the blower to the tractor hitch and wherein the frame parts are sprung and pivotally connected to the blower structure on a substantially horizontal transverse axis and include a diagonal brace which has pivotal connections to the towing frame intermediate the ends thereof and to the blower structure at a point above and on an axis extending generally parallel to the aforementioned axis of connection of the towing frame to the blower.

A more specific object of the invention is to provide a novel leaf spring connection between the hitch or towing frame in the aforementioned structure wherein the leaf spring is of a reversed C shape form having one end pivotally connected to the brace and the other end rigidly connected to the towing frame the axis of pivot paralleling the axis of pivot of the brace to the blower structure.

A still further object of the invention is to provide a novel shock absorbing means between the frame and the blower.

A further problem with blowers of the type under consideration involves excessive vibrations which develop due to unbalancing forces generated by the rotor and by the conveying mechanism and particularly when uneven loads of material are fed through the blower. These vibrations are of a high frequency character which when transferred to the long duct work extending from the outlet for blower to the top of the silo, or other storage facility, can be the cause for developing fatigue cracks in this duct work and result in ultimate failure.

The cushioning action of the yieldable connection between the hitch frame work and basic machine will provide a gentle but effective movement of this long duct work, especially when the machine is working at or near its volume capacity, to sustain adequate material flow to reach the designated height of crop delivery.

It is therefore another object of the present invention to provide novel means for damping such operational vibrations as are developed by the mechanism.

These and other objects and advantages inherent in an encompassed by the invention will become more readily apparent from the specification and the drawings, wherein:

FIGURE 1 is a plan view of a blower fragmentarily shown incorporating our invention;

FIGURE 2 is an enlarged sectional view taken substantially on the line 2—2; and

FIGURE 3 is a side elevational view with portions partly broken away, of the structure shown in FIGURE 1.

Description of the invention

The blower per se is adequately shown described in copending application Ser. No. 459,852 filed May 28, 1965, now Patent No. 3,302,978, in the name of Thomas J. Scarnato et al. titled, Diagonal Feed Material Conveyor and Blower Mechanism. The blower generally designated 2 comprises a frame 3 including an upright front portion 4 and bottom side portions 5, said bottom portions extending rearwardly of the blower component 6 and providing supports for pins or spindles 8, 8 which extend horizontally outwardly of the respective front portions 5 and provide journals for wheels 10, 10. Therefore the entire structure is capable of tilting fore and aft about the generally horizontal axis of the spindles 8.

The blower structure in addition to the casing 6 which houses the impeller which rotates on a fore and aft axis of shaft 11 comprises a hopper structure 12 which extends rearwardly of the casing 6, it being understood that the forward end of the construction herein under discussion being designated as the end which faces toward the tractor 15. The hopper 12 carries a conveying means in the form of an auger 16 as described in the beforementioned application which feeds material which is dumped into the hopper 12 into the blower housing 6 which is blown from the housing through an outlet 18 up an associated duct or pipe which is secured alongside a silo as well known to those skilled in the art.

It will be realized that the front portion of the framework 3 is suitably connected to the forward side 19 of the blower casing in a suitable manner and is therefore integrated therewith. The forward ends 20 of the side members of 5 of the frame 3 are pivotally connected as by pins or bolts 21, 22 to the rear ends of the side members 23, 24 of an A-frame draft or towing structure generally designated 25. The forward ends of the members 23 and 24 are interconnected to a clevis hitch 26 which is provided with upper and lower hinge members 27 and 28 having vertically aligned apertures for receiving a vertically disposed pivot pin 29 which extends through loose opening 30 in the drawbar 31 suitably connected to the tractor 15 in any convenient manner. Thus the blower mechanism is tiltable fore and aft about the axis of the spindles 8 with attendant pivoting with respect to the frame 25 about the horizontal axis defined by the pins 21 and 22 which is substantially parallel with the axis defined by the spindles 8. The center of gravity of the blower is shown at CG in FIGURE 3 and is located forwardly of the spindles 8 and therefore the tendency of the unit is to be biased gravationally in a forward direction as seen in FIGURE 3.

To counteract such tendency there is interposed a diagonal shock-modulating and controlling structure generally designated 35 which comprises of a brace 36 substantially centered between the lateral sides of the casing 6 and the A frame 25. Brace 36 has an upper end portion which is pivotally connected as by a substantially horizontal pin 37 to a lug 38 which projects forwardly from the forward side 19 of the casing 6. The lower forward end of the brace 36 is provided with a plurality of apertures 38 any one of which is adapted to selectively admit a generally horizontal pin 40 which provides a pivot anchor for the upper rear end portion 41 of a reverse C-shaped spring element 42 which is bowed forwardly and at its lower free end is secured as by a bolt 43 to lower leg 44 of an L section transverse brace 45, the brace 45 interconnecting the legs 23, 24 intermediate their ends and said brace also having an upright flange 46 which is disposed rearwardly of the spring 42. It will be readily appreciated that when load is imposed upon the brace 36 under transport conditions and as the unit is moved over rough terrain spring 42 will tend to flex as the elements 6 and frame 25 relatively pivot about the points 37 and 21, 22. On the other hand during operation, the hopper 12 is loaded with material and there is a weight transfer rearwardly of the spindles 8 and then a tensile load is imposed upon the spring 42. It will be observed that the hopper and all of its attendant conveying mechanisms has a cantilever suspension extending rearwardly of the spindles 8 and as various mechanisms are operating and different loads are being fed into the hopper, the blower is accommodated fore and aft movement which is yieldably resisted by the spring means 42 being understood that there is the angular relationship between the elements 36, 4 and the frame 25 changes the pivoting of frame 25 is accommodated with respect to the drawbar 31 in view of the enlarged opening 30.

Thus the instant support structural arrangement accommodates the vibrations of various components and the material being fed through the blower is continuously vibrated and is thus redistributed. This contributes to balancing the components and is helpful in eliminating choking and plugging of the blower.

We claim:

1. In a forage blower mechanism a support comprising a rear frame having a pair of wheels providing a generally horizontal axis of pivot, a blower mounted on said frame at one side of said axis, and a material conveying means mounted on the frame on the opposite side of said axis in counter balancing relation to said blower across said axis, said support including a draft frame having one end pivotally connected adjacent to the blower to said rear frame on an axis generally parallel to said horizontal axis and having means at its other end for connection to an associated towing vehicle and flexible link means including spring means having an effective connection to said rear frame at a point above said axis of pivot of said frames and to said draft frame intermediate the ends thereof.

2. The invention according to claim 1 and said link means including a rigid element and said effective connection being a pivot and the resilient element pivoted to said rigid element and connected with said draft frame.

3. The invention according to claim 1 wherein said blower includes a rotor oriented to rotate about an axis transverse to said axes whereby upon said rotor being unbalanced it is accommodated yawing movements about said horizontal axes.

4. In a forage blower mechanism a support comprising a rear frame having a pair of wheels providing a generally horizontal axis of pivot, a blower mounted on said frame at one side of said axis, and a material conveying means mounted on the frame on the opposite side of said axis in counter balancing relation to said blower across said axis, said support including a draft frame having one end pivotally connected adjacent to the blower to said rear frame on an axis generally parallel to said horizontal axis and having means at its other end for connection to an associated towing vehicle, and flexible link means including spring means having an effective connection to said rear frame at a point above said axis of pivot of said frames and to said draft frame intermediate the ends thereof wherein said link means includes a pair of pivotally interconnected elements one of which comprises a reverse C-shaped spring element.

5. The invention according to claim 4 wherein the connection between said elements is adjustable longitudinally of said link means to vary the disposition of said blower.

6. The invention according to claim 5 wherein the center of gravity of said mechanism is disposed forwardly of the pivotal axis of said wheel means.

References Cited

UNITED STATES PATENTS

| | | | |
|---|---|---|---|
| 1,783,189 | 12/1930 | Green | 280—490 |
| 2,551,870 | 5/1951 | Bridger | 280—489 |
| 2,882,667 | 4/1959 | Brady | 302—37 X |
| 3,271,082 | 9/1966 | Wood | 302—37 |
| 3,302,978 | 2/1967 | Scarnato et al. | 302—37 |

ANDRES H. NIELSEN, *Primary Examiner.*